United States Patent
Matsumoto et al.

(10) Patent No.: US 9,227,868 B2
(45) Date of Patent: Jan. 5, 2016

(54) METHOD AND APPARATUS FOR MACHINING STRENGTHENED GLASS AND ARTICLES PRODUCED THEREBY

(71) Applicant: ELECTRO SCIENTIFIC INDUSTRIES, INC., Portland, OR (US)

(72) Inventors: Hisashi Matsumoto, Hillsboro, OR (US); Haibin Zhang, Portland, OR (US); Glenn Simenson, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 13/779,183

(22) Filed: Feb. 27, 2013

(65) Prior Publication Data
US 2013/0224433 A1 Aug. 29, 2013

Related U.S. Application Data

(60) Provisional application No. 61/604,544, filed on Feb. 29, 2012.

(51) Int. Cl.
*C03B 21/06* (2006.01)
*C03B 17/06* (2006.01)
(Continued)

(52) U.S. Cl.
CPC ............ *C03B 33/091* (2013.01); *B23K 26/063* (2013.01); *B23K 26/083* (2013.01);
(Continued)

(58) Field of Classification Search
CPC .... C03B 33/02; C03B 33/0222; C03B 33/03; C03B 33/07; C03B 33/074; C03B 33/107; C03B 33/0207; C03B 33/027; C03B 33/037; C03B 33/082; C03B 33/09; C03B 33/093; C03B 33/095; C03B 33/10; C03C 21/002; B32B 17/10137

USPC .......................... 65/75, 105, 70, 97
See application file for complete search history.

(56) References Cited

U.S. PATENT DOCUMENTS

| | | | |
|---|---|---|---|
| 4,702,042 A | 10/1987 | Herrington et al. | |
| 4,828,900 A | 5/1989 | Mouly | |

(Continued)

FOREIGN PATENT DOCUMENTS

| | | | |
|---|---|---|---|
| CN | 1657220 A | 8/2005 | |
| DE | 10029110 B4 | 5/2006 | |

(Continued)

OTHER PUBLICATIONS

JP2011164508 machine translation as provided by http://dossier1.ipdl.inpit.go.jp/AIPN/odse_call_transl.ipdl?N0000=7413&N0005=Ei7BzenZVnBvfz7D1ZIK&N0120=01&N2001=2&N3001=2011-164508&Ntt3=chemistryV14&Ntt4=productsV14&Ntt5=electronicsV14&Ntt6=&Ntt7=&Ntt8=&Ntt9=&Ntt10=&Ntt11=&Ntt12=.*

(Continued)

*Primary Examiner* — Jodi C Franklin

(57) ABSTRACT

Methods and apparatus for machining substrates are disclosed, as are articles formed from the separated substrates. A method of machining a substrate having a first surface and a second surface opposite the first surface can include forming a first recess in the substrate extending from the first surface toward the second surface, forming a second recess in the substrate extending from the second surface toward the first surface, and removing a portion of the substrate extending from the first recess to the second recess to form an opening in the substrate.

23 Claims, 6 Drawing Sheets

(51) Int. Cl.

| | |
|---|---|
| *C03B 21/02* | (2006.01) |
| *C03B 33/09* | (2006.01) |
| *B32B 3/26* | (2006.01) |
| *B23K 26/40* | (2014.01) |
| *B23K 26/06* | (2014.01) |
| *B23K 26/08* | (2014.01) |
| *B23K 26/38* | (2014.01) |

(52) U.S. Cl.
CPC ......... *B23K26/0807* (2013.01); *B23K 26/0815* (2013.01); *B23K 26/381* (2013.01); *B23K 26/386* (2013.01); *B23K 26/4075* (2013.01); *B32B 3/266* (2013.01)
USPC ........................... 65/97; 65/56; 65/70

(56) References Cited

U.S. PATENT DOCUMENTS

| | | | |
|---|---|---|---|
| 5,043,553 A | 8/1991 | Corfe et al. | |
| 5,413,664 A | 5/1995 | Kawate et al. | |
| 5,609,284 A | 3/1997 | Kondratenko | |
| 5,637,244 A | 6/1997 | Erokhin | |
| 5,665,134 A | 9/1997 | Kirby et al. | |
| 5,826,772 A | 10/1998 | Ariglio et al. | |
| 5,973,290 A | 10/1999 | Noddin | |
| 6,143,382 A | 11/2000 | Koyama et al. | |
| 6,326,589 B1 | 12/2001 | Beersiek et al. | |
| 6,521,862 B1 | 2/2003 | Brannon | |
| 6,634,186 B2* | 10/2003 | Abe ............................. | 65/105 |
| 6,642,476 B2 | 11/2003 | Hamann | |
| 6,642,477 B1 | 11/2003 | Patel et al. | |
| 6,756,563 B2 | 6/2004 | Gross et al. | |
| 6,795,274 B1 | 9/2004 | Hsieh et al. | |
| 6,809,291 B1 | 10/2004 | Neil et al. | |
| 6,820,330 B1 | 11/2004 | Haba | |
| 6,962,279 B1 | 11/2005 | Marek et al. | |
| 6,992,026 B2 | 1/2006 | Fukuyo et al. | |
| 7,007,512 B2 | 3/2006 | Kamada et al. | |
| 7,023,001 B2 | 4/2006 | Cournoyer et al. | |
| 7,060,933 B2 | 6/2006 | Burrowes et al. | |
| 7,217,448 B2 | 5/2007 | Koyo et al. | |
| 7,378,342 B2 | 5/2008 | Kirby et al. | |
| 7,723,212 B2 | 5/2010 | Yamamoto et al. | |
| 8,075,999 B2 | 12/2011 | Barefoot et al. | |
| 8,383,983 B2 | 2/2013 | Lee et al. | |
| 8,584,354 B2* | 11/2013 | Cornejo et al. ................. | 29/852 |
| 8,635,887 B2* | 1/2014 | Black et al. ..................... | 65/105 |
| 2001/0035447 A1 | 11/2001 | Gartner et al. | |
| 2001/0038930 A1 | 11/2001 | Yamamoto et al. | |
| 2001/0040150 A1 | 11/2001 | Suzuki | |
| 2002/0005805 A1 | 1/2002 | Ogura et al. | |
| 2002/0033558 A1 | 3/2002 | Fahey et al. | |
| 2002/0041946 A1* | 4/2002 | Abe ............................. | 428/64.2 |
| 2002/0060978 A1 | 5/2002 | Hirotsune et al. | |
| 2003/0044539 A1 | 3/2003 | Oswald | |
| 2003/0096078 A1 | 5/2003 | Horisaka et al. | |
| 2003/0102291 A1 | 6/2003 | Liu et al. | |
| 2003/0111447 A1 | 6/2003 | Corkum et al. | |
| 2003/0150839 A1 | 8/2003 | Kobayashi et al. | |
| 2003/0201261 A1 | 10/2003 | Kang et al. | |
| 2003/0217568 A1 | 11/2003 | Koyo et al. | |
| 2004/0104846 A1 | 6/2004 | Ogura et al. | |
| 2004/0200067 A1 | 10/2004 | Ogura et al. | |
| 2005/0042805 A1* | 2/2005 | Swenson et al. ............. | 438/113 |
| 2005/0087522 A1 | 4/2005 | Sun et al. | |
| 2005/0184035 A1 | 8/2005 | Kurosawa et al. | |
| 2005/0221044 A1* | 10/2005 | Gaume et al. ................. | 428/43 |
| 2005/0223744 A1 | 10/2005 | Horisaka et al. | |
| 2006/0021978 A1 | 2/2006 | Alexeev et al. | |
| 2006/0127640 A1 | 6/2006 | Kobayashi et al. | |
| 2006/0151450 A1 | 7/2006 | You et al. | |
| 2006/0169677 A1 | 8/2006 | Deshi | |
| 2007/0012665 A1 | 1/2007 | Nelson et al. | |
| 2007/0039932 A1 | 2/2007 | Haase et al. | |
| 2007/0170162 A1 | 7/2007 | Haupt et al. | |
| 2007/0262464 A1 | 11/2007 | Watkins et al. | |
| 2007/0272666 A1 | 11/2007 | O'Brien et al. | |
| 2007/0272668 A1 | 11/2007 | Albelo et al. | |
| 2007/0291496 A1 | 12/2007 | Nashner et al. | |
| 2008/0047933 A1 | 2/2008 | Salminen et al. | |
| 2008/0093775 A1 | 4/2008 | Menoni et al. | |
| 2008/0128953 A1 | 6/2008 | Nagai et al. | |
| 2008/0185367 A1 | 8/2008 | El-Hanany et al. | |
| 2008/0283509 A1 | 11/2008 | Abramov et al. | |
| 2008/0290077 A1 | 11/2008 | DeMeritt et al. | |
| 2008/0296273 A1 | 12/2008 | Lei et al. | |
| 2009/0020511 A1 | 1/2009 | Kommera et al. | |
| 2009/0045179 A1 | 2/2009 | Williams | |
| 2009/0201444 A1* | 8/2009 | Yamabuchi et al. ............ | 349/73 |
| 2009/0242525 A1 | 10/2009 | O'Brien et al. | |
| 2010/0147813 A1* | 6/2010 | Lei et al. .................. | 219/121.72 |
| 2010/0197116 A1 | 8/2010 | Shah et al. | |
| 2010/0206008 A1 | 8/2010 | Harvey et al. | |
| 2010/0210442 A1 | 8/2010 | Abramov et al. | |
| 2010/0221583 A1 | 9/2010 | Foad et al. | |
| 2010/0243626 A1 | 9/2010 | Baldwin | |
| 2010/0291353 A1 | 11/2010 | Dejneka et al. | |
| 2010/0301024 A1 | 12/2010 | Unrath | |
| 2010/0320179 A1 | 12/2010 | Morita et al. | |
| 2011/0003619 A1* | 1/2011 | Fujii ............................. | 455/566 |
| 2011/0049765 A1 | 3/2011 | Li et al. | |
| 2011/0127242 A1 | 6/2011 | Li | |
| 2011/0127244 A1 | 6/2011 | Li | |
| 2011/0226832 A1 | 9/2011 | Bayne et al. | |
| 2011/0240611 A1 | 10/2011 | Sandström | |
| 2011/0240616 A1 | 10/2011 | Osako et al. | |
| 2011/0240617 A1 | 10/2011 | Xu et al. | |
| 2011/0318996 A1 | 12/2011 | Okafuji et al. | |
| 2012/0052252 A1* | 3/2012 | Kohli et al. .................... | 428/174 |
| 2012/0135177 A1* | 5/2012 | Cornejo et al. ................. | 428/43 |
| 2012/0135195 A1* | 5/2012 | Glaesemann et al. ......... | 428/156 |
| 2012/0145331 A1* | 6/2012 | Gomez et al. ................. | 156/712 |
| 2012/0168412 A1* | 7/2012 | Hooper ...................... | 219/121.69 |
| 2012/0196071 A1 | 8/2012 | Cornejo et al. | |
| 2012/0211923 A1 | 8/2012 | Garner et al. | |
| 2013/0155004 A1* | 6/2013 | Yoshikawa ..................... | 345/174 |
| 2013/0192305 A1* | 8/2013 | Black et al. .................. | 65/30.14 |
| 2013/0221053 A1 | 8/2013 | Zhang | |
| 2013/0224439 A1 | 8/2013 | Zhang et al. | |
| 2014/0093693 A1 | 4/2014 | Zhang et al. | |

FOREIGN PATENT DOCUMENTS

| | | | | |
|---|---|---|---|---|
| DE | 102006046313 B3 | | 1/2008 | |
| DE | 102007009786 A1 | | 8/2008 | |
| DE | 102010012265 A1 | | 11/2011 | |
| EP | 321838 B1 | | 2/1993 | |
| EP | 2096375 A1 | | 2/2009 | |
| EP | 2371778 A1 | | 3/2010 | |
| JP | 11163403 A | * | 6/1999 | ............. H01L 33/00 |
| JP | 2002-192369 A | | 7/2002 | |
| JP | 2002-241141 A | | 8/2002 | |
| JP | 2002308637 A | * | 10/2002 | ............. C03B 33/09 |
| JP | 2004-299969 A | | 10/2004 | |
| JP | 2007-290011 A | | 11/2007 | |
| JP | 2007283318 A | | 11/2007 | |
| JP | 2007319881 A | | 12/2007 | |
| JP | 2009061462 A | | 3/2009 | |
| JP | 2009280452 A | | 12/2009 | |
| JP | 2011-088179 A | | 5/2011 | |
| JP | 2011164508 A | * | 8/2011 | |
| JP | 2011230940 A | | 11/2011 | |
| JP | 2011251879 A | | 12/2011 | |
| KR | 2010031462 A | | 3/2010 | |
| KR | 2012015366 A | | 2/2012 | |
| WO | 03-002289 | | 1/2003 | |
| WO | WO2009/106582 A2 | | 9/2009 | |
| WO | 2010/096359 A1 | | 8/2010 | |
| WO | WO2011/025903 A1 | | 3/2011 | |

(56) References Cited

FOREIGN PATENT DOCUMENTS

| WO | WO2011/025908 A1 | 3/2011 |
| WO | WO 2011025908 A1 * | 3/2011 |

OTHER PUBLICATIONS

International Search Report of PCT/US2013/028022, 5 pages.
Written Opinion of PCT/US2013/027988, 2 pages.
Bradley Elkins Riley, "Evporative Etching for Non-Contact Glass Scribing Using A Single-Mode Ytterbium Fiber Laser", North Carolina State University, 2007, 96 pages.
J. Zhang et al., "High-Speed Machining of Glass Materials by Laser-Induced Plasma-Assisted Ablation Using a 532-nm Laser", Appl. Phys. A 67, 499-501, 1998.
Kunihito Nagayama et al. (2011), Pulse Laser Ablation by Reflection of Laser Pulse at Interface of Transparent Materials, Lasers—Applications in Science and Industry, Dr Krzysztof Jakubczak (Ed.), ISBN: 978-953-307-755-0, InTech, Available from: http://www.intechopen.com/books/lasers-applications-in-science-and-industry/pulse-laser-ablation-byreflection-of-laser-pulse-at-interface-of-transparent-materials.
Y. Hanada et al., "Laser-Induced Plasma-assisted Ablation (LIPAA): Fundamental and Industrial Applications", High-Power Laser Ablation VI, Proc. of SPIE vol. 6261, 626111-1 to -15 (2006).
Loeschner, U., et al. "Micromachining of glass with short ns-pulses and highly repetitive fs-laser pulses." Proceedings of the ICALEO. 2008. 9 pages.
Beat Neuenschwander et al., "Processing of Metals and Dielectric Materials with PS-Laserpulses: Results, Strategies, Limitations and Needs" Proc. SPIE 7584, Laser Applications in Microelectronic and Optoelectronic Manufacturing XV, 75840R (Feb. 17, 2010); 14 pages.
M B Strigin, A N Chudinov, "Laser Processing of Glass by Picosecond Pulses", Quantum Electronics 24 (8) 732-735 (1994).
Anatoli A. Abramov et al., "Laser Separation of Chemically Strengthened Glass" Physics Procedia 5 (2010), 285-290.
Thomas Paul Dumont, et al., "Laser Interaction With Materials: From Transparent Materials to Thin Films", Swiss Federal Institute of Technology Zurich for the degree of Doctor of Natural Sciences, Diss. ETH No. 16620, year of 2006, 162 pages.
Rico Böhme, "Laser-Induced Backside Wet Etching of Glasses and Crystals", Nov. 6, 2007, 139 pages.
Lawrence Shah et al., "Femtosecond Laser Deep Hole Drilling of Silicate Glasses in Air", applied Surface Science, 2001, pp. 151-164.
Rabia Qindeel et al., "IR Laser Plasma Interaction With Glass", American Journal of Applied Science 4 (12), 2007, pp. 1009-1015.
International search report of PCT/US2013/027947, 2 pages.
Written Opinion of PCT/US2013/027947, 5 pages.
Chinese office action for Chinese Patent Application No. 200980153523.7 issued Jan. 8, 2014, 7 pages.
Chinese office action for Chinese Patent Application No. 200980153523.7 issued Jun. 5, 2013, 8 pages.
Machine translation of Japanese Pat. Appl. Pub. No. 2001-274441, published Oct. 5, 2001.
English translation of the Aug. 17, 2015 Office action concerning Chinese Patent Application No. 2009801535237, which corresponds with U.S. Appl. No. 12/336,609.

* cited by examiner

METHOD AND APPARATUS FOR MACHINING STRENGTHENED GLASS AND ARTICLES PRODUCED THEREBY

CROSS-REFERENCE TO RELATED APPLICATIONS

This application is a Non-Provisional of U.S. Provisional Application No. 61/604,544, filed Feb. 29, 2012, which is hereby incorporated by reference in its entirety.

BACKGROUND

Embodiments of the present invention relate generally to methods for machining substrates of glass and, more specifically, to methods for machining features (e.g., through-holes, apertures, openings, etc.) in strengthened glass substrates. Embodiments of the present invention also relate to apparatuses for machining substrates of glass, and to articles of strengthened glass.

Thin strengthened glass substrates, such as chemically- or thermally-strengthened substrates have found wide-spread application in consumer electronics because of their excellent strength and damage resistance. For example, such glass substrates may be used as cover substrates for LCD and LED displays and touch applications incorporated in mobile telephones, display devices such as televisions and computer monitors, and various other electronic devices. To reduce manufacturing costs, it may be desirable that such glass substrates used in consumer electronics devices be formed by performing thin film patterning for multiple devices on a single large glass substrate, then sectioning or separating the large glass substrate into a plurality of smaller glass substrates using various cutting techniques.

However the magnitude of compressive stress and the elastic energy stored within the central tension region may make machining of chemically- or thermally-strengthened glass substrates difficult. The high surface compression and deep compression layers make it difficult to mechanically machine the glass substrate (e.g., by sawing, drilling, etc.) using conventional techniques. Furthermore, if the stored elastic energy in the central tension region is sufficiently high, the glass may chip or shatter when the surface compression layer is penetrated. In other instances, the release of the elastic energy may generate cracks within the substrate, which can ultimately reduce the strength of the machined article. Accordingly, a need exists for alternative methods for machining features in strengthened glass substrates.

SUMMARY

One embodiment described herein can be exemplarily characterized as a method that includes providing a substrate having a first surface and a second surface opposite the first surface; forming a first recess in the substrate, wherein the first recess extends from the first surface toward the second surface; forming a second recess in the substrate, wherein the second recess extends from the second surface toward the first surface; and removing a portion of the substrate extending from the first recess to the second recess to form an opening in the substrate, wherein the opening extends from the first surface to the second surface.

Another embodiment described herein can be exemplarily characterized as a method of forming an opening in a strengthened glass substrate having a first compression region, a second compression region and a tension region arranged between the first compression region and the second compression region. The method may include: removing a first portion of the substrate disposed within the first compression region; removing a second portion of the substrate disposed within the second compression region; and after removing the first portion and the second portion, removing a third portion of the substrate disposed within the tension region.

Yet another embodiment described herein can be exemplarily characterized as a strengthened glass article that includes an outer region extending from a surface of the article to a depth of layer (DOL) within the article greater than or equal to 40 µm, wherein the outer region is under a compressive stress equal to a compressive stress greater than or equal to 600 MPa; an inner region within the article and adjacent to the outer region, wherein the inner region is under a tensile stress; and an opening extending through the outer region and the inner region.

Still another embodiment described herein can be exemplarily characterized as an apparatus for forming an opening in a substrate having a first surface and a second surface opposite the first surface. The apparatus can include: a laser system configured to direct a focused beam of laser light along an optical path, the focused beam of laser light having a beam waist; a workpiece support system configured to support the strengthened glass substrate; and a controller coupled to at least of the laser system and the workpiece support system. The controller can include a processor configured to execute instructions to control the at least of the laser system and the workpiece support system to: form a first recess in the substrate, wherein the first recess extends from the first surface toward the second surface; form a second recess in the substrate, wherein the second recess extends from the second surface toward the first surface; and remove a portion of the substrate extending from the first recess to the second recess to form an opening in the substrate, wherein the opening extends from the first surface to the second surface. The controller can also include a memory configured to store the instructions.

DETAILED DESCRIPTION OF THE ILLUSTRATED EMBODIMENTS

Figure 1A:
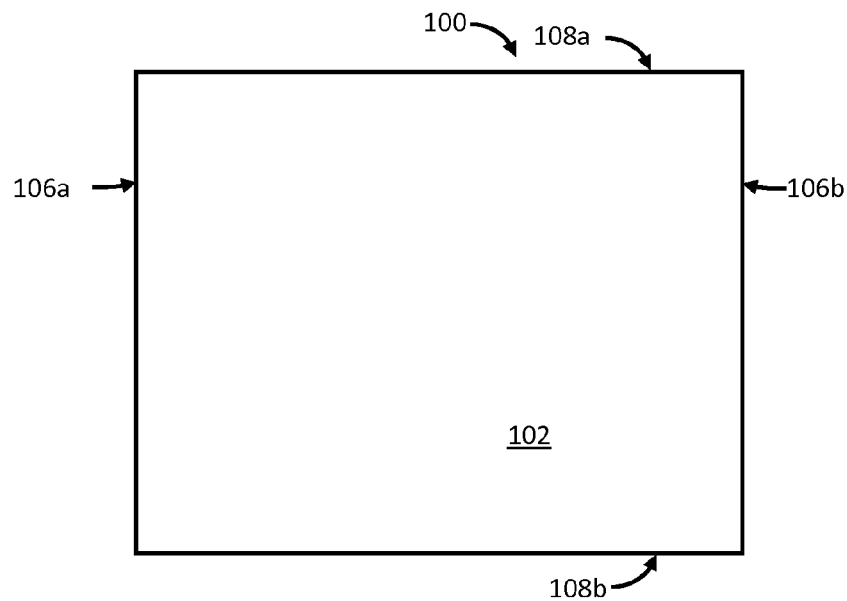
FIGS. 1A and 1B are top plan and cross-section views, respectively, illustrating a strengthened glass substrate capable of being machining according to embodiments of the present invention.

Embodiments of the invention are described more fully hereinafter with reference to the accompanying drawings. Embodiments of the invention may, however, be implemented in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

In the following description, like reference characters designate like or corresponding parts throughout the several views shown in the figures. As used herein, the singular forms "a," "an" and "the" are intended to include the plural forms as well, unless the context clearly indicates otherwise. It will also be understood that, unless otherwise specified, terms such as "top," "bottom," "outward," "inward," and the like, are words of convenience and are not to be construed as limiting terms. In addition, whenever a group is described as "comprising" at least one of a group of elements and combinations thereof, it is understood that the group may comprise, consist essentially of, or consist of any number of those elements recited, either individually or in combination with each other. Similarly, whenever a group is described as "consisting" of at least one of a group of elements or combinations thereof, it is understood that the group may consist of any number of those elements recited, either individually or in combination with each other. Unless otherwise specified, a range of values, when recited, includes both the upper and lower limits of the range, as well as any sub-ranges therebetween.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Figure 1B:
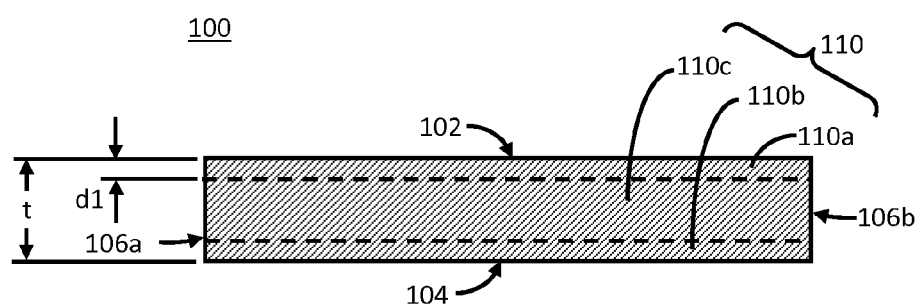

FIGS. 1A and 1B are top plan and cross-section views, respectively, illustrating a strengthened glass substrate capable of being machining according to embodiments of the present invention.

Referring to FIGS. 1A and 1B, a strengthened glass substrate 100 (also referred to herein simply as a "substrate") includes a first surface 102, a second surface 104 opposite the first surface, and edges 106a, 106b, 108a and 108b. Generally, the edges 106a, 106b, 108a and 108b extend from the first surface 102 to the second surface 104. Thus the first surface 102 and the second surface 104 are bounded by the edges 106a, 106b, 108a and 108b. Although the substrate 100 is illustrated as essentially square when viewed from a top plan view, it will be appreciated that the substrate 100 can be any shape when viewed from a top plan view. The substrate 100 can be formed from any glass composition including, without limitation, borosilicate glasses, soda-lime glass, aluminosilicate glass, aluminoborosilicate glass, or the like, or a combination thereof. The substrate 100 machined according to the embodiments described herein may be strengthened by a strengthening process such as an ion exchange chemical strengthening process, thermal tempering, or the like or a combination thereof. It should be understood that although embodiments herein are described in the context of chemically strengthened glass substrates, other types of strengthened glass substrates may be machined according the embodiments exemplarily described herein. Generally, the substrate 100 may have a thickness, t, greater than 200 µm and less than 10 mm. In one embodiment, the thickness, t, may be in a range from 500 µm to 2 mm. In another embodiment, the thickness, t, may be in a range from 600 µm to 1 mm. It will be appreciated, however, that the thickness, t, may be greater than 10 mm or less than 200 µm.

Referring to FIG. 1B, an interior 110 of the substrate 100 includes compression regions (e.g., first compression region 110a and second compression region 110b) and a tension region 110c. Portions of the substrate 100 within the compression regions 110a and 110b are kept in a compressive stress state that provides the glass substrate 100 its strength. The portion of the substrate 100 in the tension region 110c is under tensile stress to compensate for the compressive stresses in the compression regions 110a and 110b. Generally, the compressive and tensile forces within the interior 110 balance each other out so the net stress of the substrate 100 is zero.

As exemplarily illustrated, the first compression region 110a extends from the first main surface 102 toward the second main surface 104 by a distance (or depth) d1, and thus has a thickness (or "depth of layer", DOL) of d1. Generally, d1 can be defined as the distance from the physical surface of the substrate 100 to a point within the interior 110 where the stress is zero. The DOL of the second compression region 110b can also be d1.

Depending on process parameters such as composition of the substrate 100 and the chemical and/or thermal process by which the substrate 100 was strengthened, all of which are known to those skilled in the art, d1 can be generally greater than 10 µm. In one embodiment, d1 is greater than 20 µm. In one embodiment, d1 is greater than 40 µm. In another embodiment, d1 is greater than 50 µm. In yet embodiment, d1 can even be greater than 100 µm. It will be appreciated that the substrate 100 can be prepared in any manner to produce a compression region with d1 less than 10 µm. In the illustrated embodiment, the tension region 110c extends to the edge surfaces 106a and 106b (as well as edge surfaces 108a and 108b). In another embodiment, however, additional compression regions can extend along edge surfaces 106a, 106b, 108a and 108b. Thus, collectively, the compression regions form a compressively-stressed outer region extending from the surfaces of the substrate 100 into an interior of the substrate 100 and the tension region 110c, which is under a state of tension, is surrounded by compressively-stressed outer region.

Depending on the aforementioned process parameters, the magnitude of compressive stress in the compression regions 110a and 110b are measured at or near (i.e., within 100 µm) the first surface 102 and second surface 104, respectively, and can be greater than 69 MPa. For example, in some embodiments the magnitude of compressive stresses in the compression regions 110a and 110b can be greater than 100 MPa, greater than 200 MPa, greater than 300 MPa, greater than 400 MPa, greater than 500 MPa, greater than 600 MPa, greater than 700 MPa, greater than 800 MPa, greater than 900 MPa, or even greater than 1 GPa. The magnitude of tensile stress in the tension region 110c can be obtained by the following:

$$CT = \frac{CS \times DOL}{t - 2 \times DOL}$$

where CT is the central tension within the substrate 100, CS is the maximum compressive stress in a compression region(s) expressed in MPa, t is the thickness of the substrate 100 expressed in mm, and DOL is the depth of layer of the compression region(s) expressed in mm.

Having exemplarily described a substrate 100 capable of being machined according to embodiments of the present invention, exemplary embodiments of machining the substrate 100 will now be described. Upon implementing these methods, features such as through-holes, apertures, openings, and the like (collectively referred to herein as "openings") may be formed within the substrate 100.

FIGS. 2A to 12 illustrate various embodiments of processes of machining a strengthened glass substrate such as substrate 100, which includes removing a first portion of the substrate 100 in the first compression region 110a to form a first recess in the substrate 100 that extends from the first surface 102 toward the second surface 104, removing a second portion of the substrate 100 in the second compression region 110b to form a second recess in the substrate 100 that extends from the second surface 104 toward the first surface 102 and, thereafter, removing a third portion of the substrate 100 in the tension region 110c (e.g., extending from the first recess to the second recess) to form an opening in the substrate 100 that extends from the first surface 102 to the second surface 104.

Figure 2A:
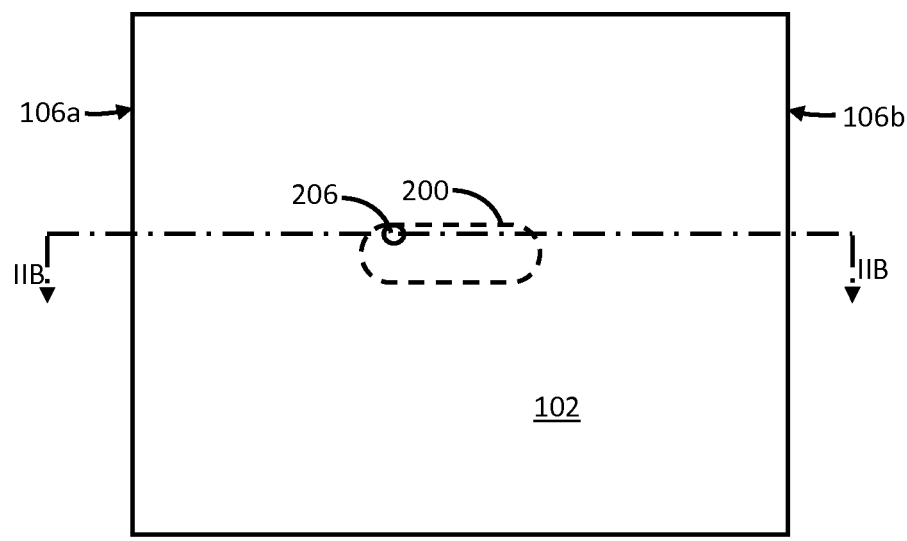
FIG. 2A is a plan view illustrating one embodiment of a processing region of the substrate exemplarily described with respect to FIGS. 1A and 1B.
Figure 2B:
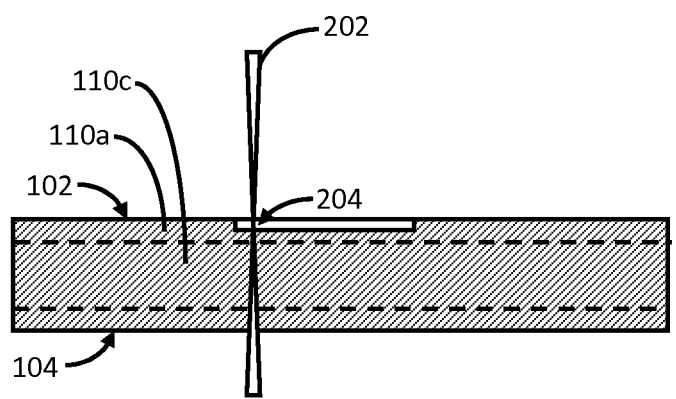
FIGS. 2B and 3 to 5 are cross-section views, taken along line IIB-IIB of FIG. 2A, illustrating one embodiment of a process of machining a feature in a strengthened glass substrate.

Referring to FIG. 2A, a beam 202 of laser light can be directed onto a processing region 200 of the substrate 100. The beam 202 can be caused to move relative to the substrate 100 to remove portions of the substrate 100 within the first compression region 110a. FIG. 2B illustrates the substrate 100 in a state at which the beam 202 has removed a portion of the first compression region 110a. Generally, the beam 202 of laser light is directed onto the substrate along an optical path such that the beam 202 passes through the first surface 102 and, thereafter, through the second surface 104. In one embodiment, the light within the beam 202 is provided as a series of pulses of laser light and the beam 202 can be directed along the optical path by first producing a beam of laser light and then subsequently focusing the beam of laser light to produce the beam waist 204. In the illustrated embodiment, the beam waist 204 can intersect the first surface 102 (so as to be at the first surface 102), or can be located within the substrate 100 (e.g., adjacent to the first surface 102 or adjacent to the second surface 104) or outside the substrate 100 (e.g., such that beam waist 204 is closer to the first surface 102 than the second surface 104, or such that the beam waist 204 is closer to the second surface 104 than the first surface 102). It will be appreciated that the position of the beam waist 204 along the optical path relative to the substrate 100 can be modified by changing the manner in which the beam 202 is focused. In still another other embodiment, the beam waist 204 can intersect the second surface 104 (so as to be at the second surface 104).

When located outside the substrate 100, the beam waist 204 can be spaced apart from the substrate (e.g., when measured along the optical path) by a distance greater than 0.5 mm. In one embodiment, the beam waist 204 can be spaced apart from the substrate 100 by a distance less than 3 mm. In one embodiment, the beam waist 204 can be spaced apart from the substrate 100 by a distance of 1.5 mm. It will be appreciated, however, that the beam waist 204 can be spaced apart from the substrate 100 by a distance greater than 3 mm or less than 0.5 mm.

Generally, light within the beam 202 of laser light has at least one wavelength greater than 100 nm. In one embodiment, light within the beam 202 of laser light can have at least one wavelength less than 3000 nm. For example, light within the beam 202 of laser light can have a wavelength of 523 nm, 532 nm, 543 nm, or the like or a combination thereof. As mentioned above, light within the beam 202 is provided as a series of pulses of laser light. In one embodiment, at least one of the pulses can have a pulse duration greater than 10 femtoseconds (fs). In another embodiment, at least one of the pulses can have a pulse duration less than 500 nanoseconds (ns). In yet another embodiment, at least one pulse can have a pulse duration of about 10 picoseconds (ps). Generally, the pulse duration can be selected by balancing the high throughput but potential thermal damage induced by a relative long pulse duration against the time and expense required but relatively low thermal damage when using a relatively short pulse duration. Moreover, the beam 202 may be directed along the optical path at a repetition rate greater than 10 Hz. In one embodiment, the beam 202 may be directed along the optical path at a repetition rate less than 100 MHz. In another embodiment, the beam 202 may be directed along the optical path at a repetition rate in a range from about 400 kHz to about 2 MHz. It will be appreciated that the power of the beam 202 may be selected based on, among other parameters, the wavelength of light within the beam 202 and the pulse duration. For example, when the beam 202 has a green wavelength (e.g., 523 nm, 532 nm, 543 nm, or the like) and a pulse duration of about 10 ps, the power of the beam 202 may have a power of 20 W (or about 20 W). In another example, when the beam 202 has a UV wavelength (e.g., 355 nm, or the like) and a pulse duration of about less than 10 ns (e.g., 1 ns), the power of the beam 202 may have a power in a range from 10 W-20 W (or from about 10 W to about 20 W). It will be appreciated, however, that the power of the beam 202 may be selected as desired.

Generally, parameters of the beam 202 (also referred to herein as "beam parameters") such as the aforementioned wavelength, pulse duration, repetition rate and power, in addition to other parameters such as spot size, spot intensity, fluence, or the like or a combination thereof, can be selected such that the beam 202 has an intensity and fluence in a spot 206 at the first surface 102 sufficient to ablate a portion of the substrate 100 illuminated by the spot 206 or to induce multiphoton absorption of light within the beam 202 by the portion of the first surface 102 illuminated by the spot 206. However by changing, for example, the manner in which the beam 202 is focused, the spot 206 can be moved to the second surface 104. Accordingly, a portion of the substrate 100 at the first surface 102 or the second surface 104 can be removed when the portion is illuminated by the spot 206. In one embodiment, the spot 206 can have a circular shape with a diameter greater than 1 μm. In another embodiment, the diameter of the spot 206 can be less than 100 μm. In yet another embodiment, the diameter of the spot 206 can be about 30 μm. It will be appreciated, however, that the diameter can be greater than 100 μm or less than 1 μm. It will also be appreciated that the spot 206 can have any shape (e.g., ellipse, line, square, trapezoid, or the like or a combination thereof).

Generally, the beam 202 can be scanned along one or more removal paths within the processing region 200 to remove a portion of the substrate 100 and form a first recess (e.g., as denoted at 300 in FIG. 3) within the first compression region 110a. It will be appreciated that the scan rate and the number of times the beam 202 is scanned within the processing region 200 can be selected based on the aforementioned beam parameters, as well as desired depth of the first recess 300, the composition of the substrate, edge quality desired of the machined opening within the substrate 100, and the like.

Figure 3:
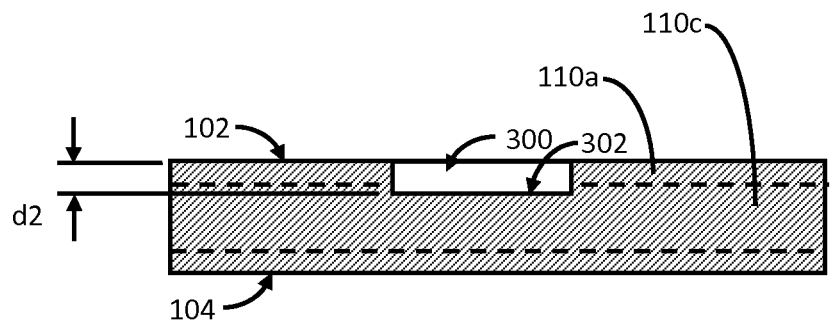

Referring to FIG. 3, the depth d2 of the first recess 300 can be defined as the distance from the physical surface of the substrate 100 in which it is formed (e.g., the first surface 102, as exemplarily illustrated) to the lower surface 302 of the first recess 300. Depending on the aforementioned beam parameters, scanning parameters, and the like, d2 can be greater than d1, equal to d1 or less than d1. When d2 is greater than d1, d2 can be in a range of 5% (or less than 5%) to 100% (or more than 100%) greater than d1. When d2 is less than d1, d2 can be in a range of 1% (or less than 1%) to 90% (or more than 90%) less than d1. In one embodiment, the aforementioned beam parameters, scanning parameters, and the like, can be selected such that d2 can be at least 10 μm, at least 20 μm, at least 30 μm, at least 40 μm, at least 50 μm, or more than 50 μm or less than 10 μm.

Figure 4:
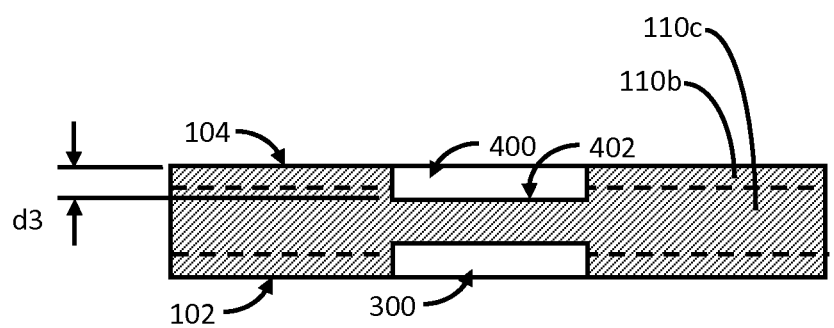

Referring to FIG. 4, after the first recess 300 is formed, the substrate 100 is moved (e.g., flipped) and the beam 202 is caused to move relative to the substrate 100 to remove portions of the substrate 100 within the second compression region 110b, thereby forming a second recess 400. Generally, the beam 202 of laser light is directed onto the substrate along an optical path such that the beam 202 passes through the second surface 104 and, thereafter, through the first surface 102. When forming the second recess 400, the beam waist 204 of the beam 202 can intersect the second surface 104 (so as to be at the second surface 104), or can be located within the substrate 100 (e.g., adjacent to the second surface 104 or adjacent to the first surface 102) or outside the substrate 100 (e.g., such that beam waist 204 is closer to the second surface 104 than the first surface 102, or such that the beam waist 204 is closer to the second surface 104 than the second surface 104). In still another other embodiment, the beam waist 204 can intersect the first surface 102 (so as to be at the first surface 102). Other parameters of the beam 202 may be the same or different from the beam parameters discussed above with respect to the formation of the first recess 300.

Referring still to FIG. 4, the depth d3 of the second recess 400 can be defined as the distance from the physical surface of the substrate 100 in which it is formed (e.g., the second surface 104, as exemplarily illustrated) to the lower surface 402 of the second recess 400. Depending on the aforementioned beam parameters, scanning parameters, and the like, d3 can be greater than d1, equal to d1 or less than d1. When d3 is greater than d1, d3 can be in a range of 5% (or less than 5%) to 100% (or more than 100%) greater than d1. When d3 is less than d1, d3 can be in a range of 1% (or less than 1%) to 90% (or more than 90%) less than d1. In one embodiment, the aforementioned beam parameters, scanning parameters, and the like, can be selected such that d3 can be at least 10 μm, at least 20 μm, at least 30 μm, at least 40 μm, at least 50 μm, or more than 50 μm or less than 10 μm.

Figure 5:
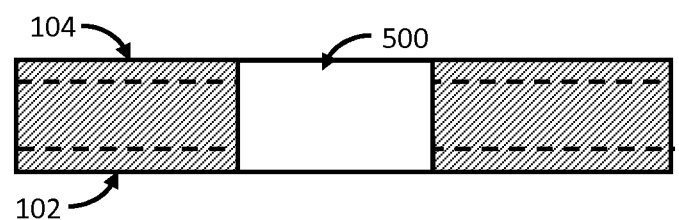
Figure 6:
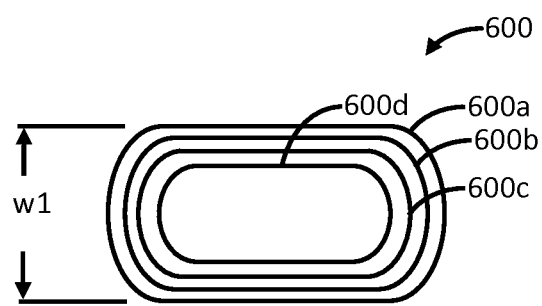
FIGS. 6 and 7 schematically illustrate some embodiments of removal paths along which a beam of laser light can be moved to machine a feature in a strengthened glass substrate.
Figure 7:
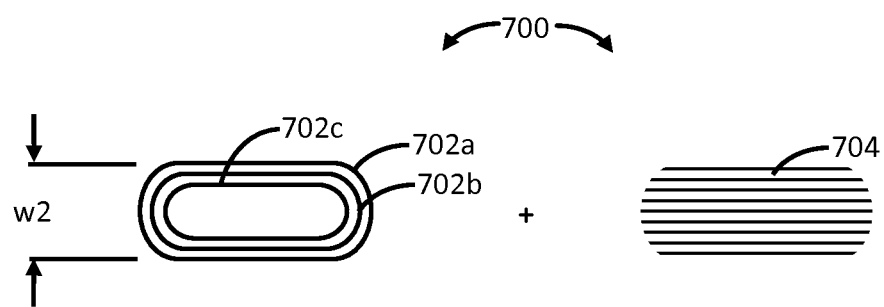

Referring to FIG. 5, after the second recess 400 is formed, the beam 202 is caused to move relative to the substrate 100 to remove a third portion of the substrate 100 within the tension region 110c that extends from the second recess 400 to the first recess 300. Generally, the beam 202 of laser light is directed onto the substrate along an optical path such that the beam 202 passes through the second surface 104 and, thereafter, through the first surface 102. In other embodiments, however, the substrate 100 may be flipped so that the beam 202 passes through the first surface 102 and, thereafter, through the second surface 104. It will be appreciated that placement of the beam waist 204 relative to the substrate can be selected as described above to facilitate desired removal of the third portion of the substrate 100. Upon removing the third portion of the substrate 100, an opening 500 that extends from the first surface 102 to the second surface 104 is formed in the substrate 100. In one embodiment, the process of removing the third portion of the substrate 100 starts immediately after the second recess 400 is formed. Thus, the formation of the second recess 400 can be considered as an intermediate step in process of forming the opening 500. Although the third portion of the substrate is discussed above as being removed using the beam 202, it will be appreciated that the third portion can be removed in any suitable manner (e.g., mechanical drilling, mechanical sawing, chemical etching, or the like or a combination thereof).

Formed as exemplarily described above, the opening 500 has a first perimeter defined in the first surface 102 that is spaced apart from the edges 106a, 106b, 108a and 108b. Likewise, the opening 500 has a second perimeter defined in the second surface 104 that is also spaced apart from the edges 106a, 106b, 108a and 108b. It will be appreciated that the first and second perimeters of the opening 500 can be sized and shaped in any manner desired. In one embodiment, the size and shape of the first perimeter and/or second perimeter can correspond to the size and/or shape of the processing region (e.g., as shown in FIG. 2A).

In some embodiments, the one or removal paths along which the beam 202 is scanned can be configured based on the size and geometry of the opening 500 desired to be formed in the substrate 100, the composition of the substrate, the DOL of the compression region being machined, the compressive stress in the compression region being machined, the amount of heat generated within the substrate 100 by the beam 202, or the like or a combination thereof. In one embodiment, appropriate selection of one or more removal paths can facilitate efficient formation of the opening 500 within the substrate 100 and also reduce or prevent the formation of cracks within the substrate 100 during formation of the opening 500. For example, and with reference to FIG. 6, a removal path pattern 600 having a plurality of concentric removal paths, such as removal paths 600a, 600b, 600c and 600d. In another embodiment, and with reference to FIG. 7, a removal pattern, such as pattern 700, may include a plurality of concentric removal paths such as paths 702a, 702b and 702c superimposed with linear raster scan paths 704. Pattern 600 may be used when the substrate being machined has a compression region that is relatively thin (e.g., a DOL up to about 10 μm, about 15 μm or about 20 μm) and/or relatively weak (e.g., a CS of about 100 MPa or less). Pattern 700 may be used when the substrate being machined has a compression region that is relatively thick (e.g., a DOL up to about 20 μm, about 30 μm or about 40 μm or greater) and/or relatively strong (e.g., a CS of about 600 MPa or more).

Figure 8:
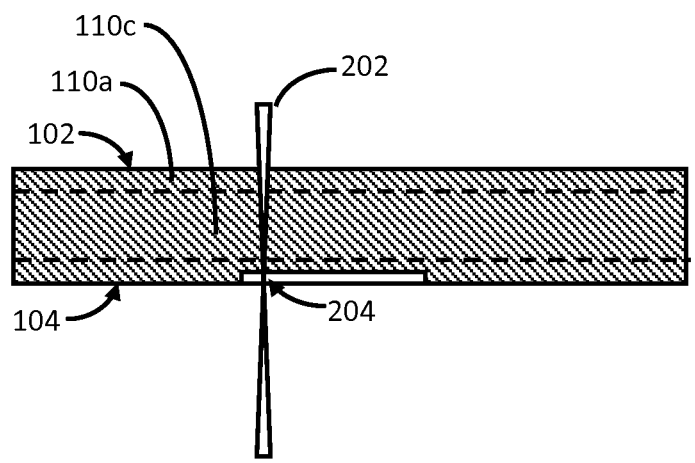
FIGS. 8 to 10 are cross-section views, taken along line IIB-IIB of FIG. 2A, illustrating another embodiment of a process of machining a feature in a strengthened glass substrate.
Figure 9:
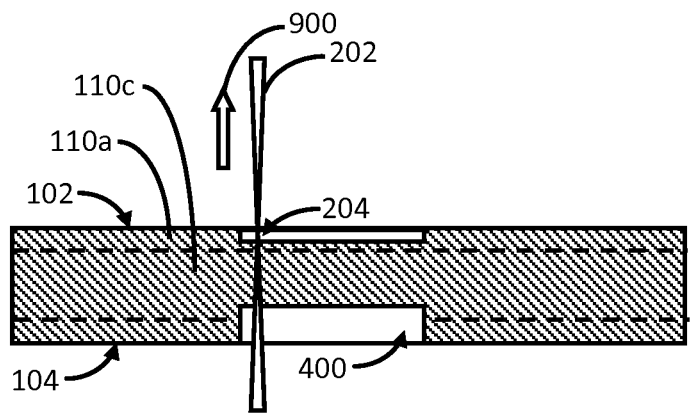
Figure 10:
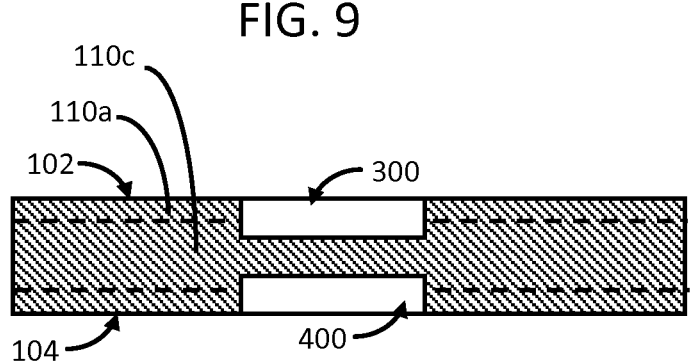

FIGS. 8 to 10 are cross-section views, taken along line IIB-IIB of FIG. 2A, illustrating another embodiment of a process of machining a feature in a strengthened glass substrate.

Referring to FIG. 8, a beam 202 of laser light can be directed onto a processing region 200 of the substrate 100 (e.g., as shown in FIG. 2A) and the beam 202 can be caused to move relative to the substrate 100 to remove portions of the substrate 100 within the second compression region 110b. FIG. 8 illustrates the substrate 100 in a state at which the beam 202 has removed a portion of the second compression region 110b. Generally, the beam 202 of laser light is directed onto the substrate along an optical path such that the beam 202 passes through the first surface 102 and, thereafter, through the second surface 104. It will be appreciated that scanning of the beam 202 and placement of the beam waist 204 relative to the substrate 100 can be selected as described above to facilitate desired removal of the second portion of the substrate 100. Upon removing the second portion of the substrate 100, the aforementioned second recess 400 as shown in FIG. 9 is formed in the second compression region 110b.

Referring to FIG. 9, after the second recess 400 is formed, the position of the beam waist 204 of the beam 202 can be adjusted relative to the substrate 100 (e.g., along the direction of arrow 900) to remove portions of the substrate 100 within the first compression region 110a, thereby forming the aforementioned first recess 300 as shown in FIG. 10. Generally, the beam 202 of laser light is directed onto the substrate along an optical path such that the beam 202 passes through the second surface 104 and, thereafter, through the first surface 102. Parameters such as beam waist placement and other parameters of the beam 202 can be selected as described above to facilitate desired removal of the first portion of the substrate 100.

After the first recess 300 is formed, the third portion of the substrate 100 within the tension region 110c that extends from the second recess 400 to the first recess 300 may be removed as exemplarily discussed with respect to FIG. 5, to form the opening 500 shown in FIG. 5. In one embodiment, the process of removing the third portion of the substrate 100 starts immediately after the first recess 300 is formed. Thus, the formation of the first recess 300 can be considered as an intermediate step in process of forming the opening 500.

Figure 11:
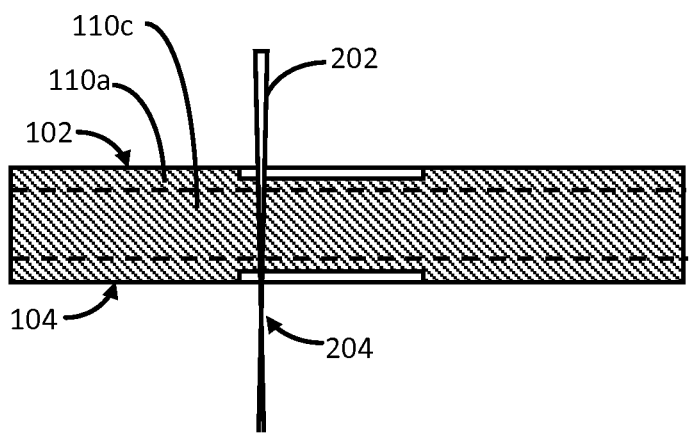
FIGS. 11 and 12 are cross-section views, taken along line IIB-IIB of FIG. 2A, illustrating yet another embodiment of a process of machining a feature in a strengthened glass substrate.
Figure 12:
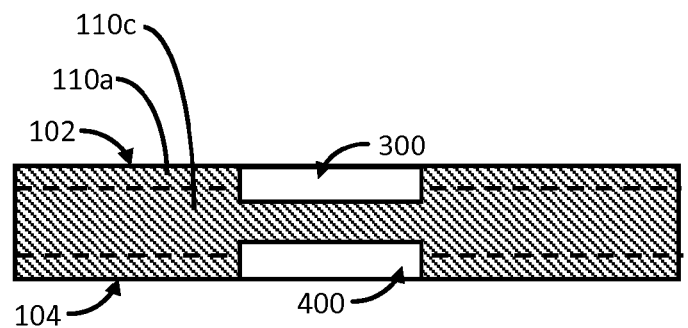

FIGS. 11 and 12 are cross-section views, taken along line IIB-IIB of FIG. 2A, illustrating yet another embodiment of a process of machining a feature in a strengthened glass substrate.

Referring to FIG. 11, a beam 202 of laser light can be directed onto a processing region 200 of the substrate 100 (e.g., as shown in FIG. 2A) and the beam 202 can be caused to move relative to the substrate 100 to remove portions of the substrate 100 within the first compression region 110a and the second compression region 110b. FIG. 11 illustrates the substrate 100 in a state at which the beam 202 has removed a portion of the second compression region 110b. Generally, the beam 202 of laser light is directed onto the substrate along an optical path such that the beam 202 passes through the first surface 102 and, thereafter, through the second surface 104. It will be appreciated that scanning of the beam 202 and placement of the beam waist 204 relative to the substrate 100 can be selected as described above to facilitate desired removal of the first and second portions of the substrate 100. Upon removing the first and second portions of the substrate 100, the first recess 300 is formed while the second recess 400 is formed. In one embodiment, the first recess 300 and the second recess 400 are simultaneously formed, as shown in FIG. 12.

After the first recess 300 and second recess 400 are formed, the third portion of the substrate 100 within the tension region 110c that extends from the second recess 400 to the first recess 300 may be removed as exemplarily discussed with respect to FIG. 5, to form the opening 500 shown in FIG. 5.

As mentioned above, the opening 500 has a first perimeter defined in the first surface 102 and a second perimeter defined in the second surface 104. It will be appreciated that the processes exemplarily described herein can permit machining of strengthened glass substrates to form openings that are difficult to form by conventional techniques. In one embodiment, an area enclosed by the first perimeter and/or the second perimeter is greater than 0.7 mm². In another embodiment, the area enclosed by the first perimeter and/or the second perimeter is less than 50 mm². For example, the area enclosed by the first perimeter and/or the second perimeter can be less than 28 mm², less than 12 mm², or less than 3 mm². It will be appreciated that embodiments of the present invention may be implemented to form openings for which an area enclosed by the first perimeter and/or the second perimeter can be greater than 50 mm². In one embodiment, the first perimeter and/or the second perimeter can include a curved region with a radius of curvature greater than 0.25 mm⁻¹. In another embodiment, the first perimeter and/or the second perimeter can include a curved region with a radius of curvature less than 2 mm⁻¹. For example, the radius of curvature can be less than 1 mm⁻¹, less than 0.5 mm⁻¹, or less than 0.3 mm⁻¹. In one embodiment, the first perimeter and/or the second perimeter can include a first linear region and a second linear region spaced apart from the first linear region by a minimum separation distance greater than 0.5 mm. In another embodiment, the minimum separation distance can be less than 8 mm. For example, the minimum separation distance can be less than 6 mm, less than 4 mm, less than 2 mm, or less than 1 mm. It will be appreciated that embodiments of the present invention may be implemented to form openings for which the first and second linear regions are spaced apart from each other by a minimum separation distance of greater than 8 mm. The aforementioned first linear region can be parallel, perpendicular or oblique with respect to the second linear region. Further, a length of the first linear region and/or the second linear region can a length can be greater than 1 mm. In one embodiment, the length can be less than 20 mm, less than 15 mm, or less than 10 mm. It will be appreciated that embodiments of the present invention may be implemented such that the length can be more than 20 mm. In one embodiment, the first perimeter and/or the second perimeter can define a shape having at least one elongated region with an aspect ratio (calculated as the ratio of the smallest diameter to the largest diameter orthogonal to the largest diameter) less than or equal to 1, less than 0.5, less than 0.1, less than 0.08 or less than 0.05. In one embodiment, the first perimeter and/or the second perimeter can define a shape having at least one elongated region with a circularity (calculated as a function of the length of the perimeter (L) and the area (A) defined by the perimeter; specifically, $4\pi A/L^2$) less than or equal to 1, less than 0.7, less than 0.5, less than 0.2, or greater than 0.05.

Figure 13:
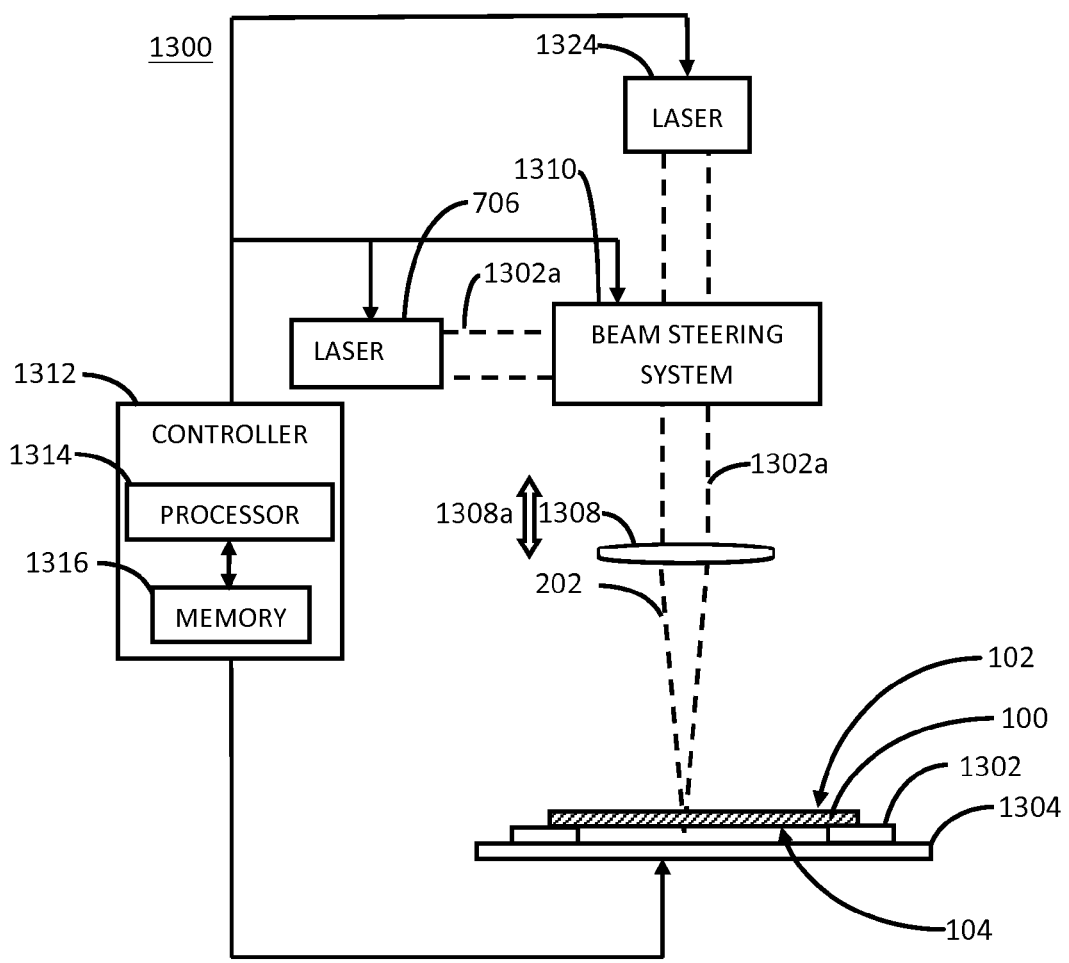
FIG. 13 schematically illustrates one embodiment of an apparatus configured to perform the processes exemplarily described with respect to FIGS. 2A-12.

Upon forming an opening, such as opening 500, the substrate can be characterized as a strengthened glass article (also referred to herein as an "article"). Strengthened glass articles can be used as protective cover plates (as used herein, the term "cover plate" includes a window, or the like) for display and touch screen applications such as, but not limited to, portable communication and entertainment devices such as telephones, music players, video players, or the like; and as a display screen for information-related terminals (IT) (e.g., portable computer, laptop computer, etc.) devices; as well as in other applications. It will be appreciated that the strengthened glass articles exemplarily described above may be formed using any desired apparatus. FIG. 13 schematically illustrates one embodiment of an apparatus configured to perform the processes exemplarily described with respect to FIGS. 2A-12.

Referring to FIG. 13, an apparatus, such as apparatus 1300, can separate a strengthened glass substrate such as substrate 100. The apparatus 1300 may include a workpiece positioning system and a laser system.

Generally, the workpiece support system is configured to support the substrate 100 such that the first surface 102 faces toward the laser system and such that the beam waist 204 is locatable relative to the substrate 100 as described above with respect to, for example, FIG. 2B. As exemplarily illustrated, the workpiece support system can include a chuck such as chuck 1302 configured to support the substrate 100 and a movable stage 1304 configured to move the chuck 1302. The chuck 1302 can be configured to contact only a portion of the second surface 104 of substrate 100 (as illustrated) or may contact all of the second surface 104. Generally, the moveable stage 1304 is configured to move the chuck 1302 laterally relative to the laser system. Thus the moveable stage 1304 can be operated to cause the beam waist to be scanned relative to the substrate 100.

Generally, the laser system is configured to direct a beam such as the aforementioned beam 202 along an optical path (wherein the beam 202 has a beam waist as exemplarily described above with respect to beam waist 204). As exemplarily illustrated, the laser system may include a laser 1306 configured to produce a beam 1302a of laser light and an optical assembly 1308 configured to focus the beam 1302a to produce the beam waist 204. The optical assembly 1308 may include a lens and may be moveable along a direction indicated by arrow 1308a to change the location (e.g., along a z-axis) of the beam waist of the beam 202 relative to the substrate 100. The laser system may further include a beam steering system 1310 configured to move the beam waist of the beam 202 laterally relative to the substrate 100 and the workpiece support system. In one embodiment, the beam steering system 1310 can include a galvanometer, a fast steering mirror, an acousto-optic deflector, an electro-optic deflector or the like or a combination thereof. Thus the beam steering system 1310 can be operated to cause the beam waist to be scanned relative to the substrate 100.

The apparatus 1300 may further include a controller 1312 communicatively coupled to one or more of the components of the laser system, to one or more of the components of the workpiece support system, or a combination thereof. The controller may include a processor 1314 and a memory 1316. The processor 1314 may be configured to execute instructions stored by the memory 1316 to control an operation of at least one component of the laser system, the workpiece support system, or a combination thereof so that the embodiments exemplarily described above with respect to FIGS. 1 to 12 can be performed.

Generally, the processor 1314 can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, processor 1314 includes a programmable microcontroller microprocessor, or other processor that can include one or more processing units arranged to execute instructions stored in memory 1316 in accordance with the operating logic. Memory 1316 can include one or more types including semiconductor, magnetic, and/or optical varieties, and/or may be of a volatile and/or nonvolatile variety. In one embodiment, memory 1316 stores instructions that can be executed by the operating logic. Alternatively or additionally, memory 1316 may store data that is manipulated by the operating logic. In one arrangement, operating logic and memory are included in a controller/processor form of operating logic that manages and controls operational aspects of any component of the apparatus 1300, although in other arrangements they may be separate.

The foregoing is illustrative of embodiments of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific example embodiments of the invention disclosed, and that modifications to the disclosed example embodiments, as well as other embodiments, are intended to be included within the scope of the appended claims. The invention is defined by the following claims, with equivalents of the claims to be included therein.

What is claimed is:

1. A method, comprising:
providing a strengthened glass substrate having a first surface, a second surface, a first compression region, a second compression region, and a tension region, wherein the second surface is opposite the first surface, wherein the first compression region extends from the first surface to toward the second surface, wherein the first compression region has a first compression depth of layer at which the strengthened glass substrate exhibits zero stress, wherein the second compression region extends from the second surface toward the first surface, wherein the second compression region has a second compression depth of layer at which the strengthened glass substrate exhibits zero stress, and wherein the tension region is arranged between the first compression region and the second compression region;
producing a focused beam of laser light;
directing the focused beam of laser light to form a first recess in the substrate, wherein the first recess extends from the first surface toward the second surface to a first depth that is less than or equal to 200% of the first compression depth;
directing the focused beam of laser light to form a second recess in the substrate, wherein the second recess extends from the second surface toward the first surface to a second depth that is less than or equal to 200% of the second compression depth; and
directing the focused beam of laser light to remove a portion of the substrate extending from the first recess to the second recess to form an opening in the substrate by ablation, wherein the opening extends from the first surface to the second surface.

2. The method of claim 1, wherein a stress within at least one of the first or second compression regions is greater than 600 MPa.

3. The method of claim 1, wherein forming at least one of the first recess, the second recess, and the opening comprises:
providing a source of laser light;
producing the beam of laser light with the source of laser light;
directing the beam of laser light onto the substrate along an optical path; and
removing a portion of the substrate with the directed beam of laser light.

4. The method of claim 3, wherein directing the beam of laser light includes directing at least one pulse of the laser light having a pulse duration greater than 10 femtoseconds (fs).

5. The method of claim 3, wherein directing the beam of laser light includes directing at least one pulse of the laser light having a pulse duration less than 100 nanoseconds (ns).

6. The method of claim 3, wherein directing the beam of laser light comprises focusing the beam of laser light to produce a beam waist located outside the substrate or at the first surface or the second surface.

7. The method of claim 3, wherein removing the portion of the substrate with the directed beam of laser light includes ablating the portion of the substrate.

8. The method of claim 3, wherein removing the portion of the substrate with the directed beam of laser light includes stimulating multiphoton absorption of light at the portion of the substrate.

9. The method of claim 3, further comprising:
moving the optical path along a plurality of removal paths within a processing region of the substrate; and
removing portions of the substrate within the processing region based on the moving optical path.

10. The method of claim 9, wherein at least one of the plurality of removal paths is concentric with another of the plurality of removal paths.

11. The method of claim 9, wherein at least one of the plurality of removal paths is parallel with another of the plurality of removal paths.

12. The method of claim 3, wherein forming the first recess includes directing the beam of laser light to pass through the first surface and to pass through the second surface after passing through the first surface.

13. The method of claim 3, wherein forming the second recess includes directing the beam of laser light to pass through the first surface and to pass through the second surface after passing through the first surface.

14. The method of claim 3, further comprising changing a position of the beam waist along the optical axis relative to the substrate between formation of the first recess and the second recess.

15. The method of claim 3, wherein removing the portion of the substrate extending from the first recess to the second recess includes directing the beam of laser light to pass through the first recess and to pass through the second recess after passing through the first recess.

16. The method of claim 3, wherein the first depth is less than or equal to the first compression depth.

17. The method of claim 3, wherein the first depth is from 5% to 100% greater than the first compression depth.

18. The method of claim 3, further comprising:
moving the optical path along one or more removal paths within a processing region of the substrate to remove portions of the substrate extending from the first recess to the second recess to form the opening in the substrate, wherein selection of the one or more removal paths reduces or prevents formation of cracks within the substrate during formation of the opening in the substrate.

19. The method of claim 1, wherein at least one first surface and the second surface is bounded by an edge and wherein a perimeter of the opening defined within the at least one of the first surface and the second surface is spaced apart from the edge.

20. The method of claim 19, wherein an area enclosed by the perimeter is greater than 0.7 mm$^2$ and less than 50 mm$^2$.

21. The method of claim 19, wherein the perimeter comprises a curved region with a radius of curvature greater than 0.25 mm$^{-1}$ and less than 2 mm$^{-1}$.

22. The method of claim 19, wherein the perimeter comprises a first linear region and a second linear region, wherein the second linear region is spaced apart from the first linear region by a minimum separation distance greater than 0.5 mm less than 8 mm.

23. A method of forming an opening in a strengthened glass substrate having a first compression region, a second compression region and a tension region arranged between the first compression region and the second compression region, the method comprising:
producing a focused beam of laser light;
directing the focused beam of laser light to remove a first portion of the substrate disposed within the first compression region, wherein the first compression region has a first compression depth of layer at which the strengthened glass substrate exhibits zero stress, and wherein the first portion has a first depth that is less than or equal to 200% of the first compression depth;
directing the focused beam of laser light to remove a second portion of the substrate disposed within the second compression region, wherein the second compression region has a second compression depth of layer at which the strengthened glass substrate exhibits zero stress, and wherein the second portion has a second depth that is less than or equal to 200% of the second compression depth; and
after removing the first portion and the second portion, directing the focused beam of laser light to remove a third portion of the substrate disposed within the tension region to form the opening by ablation.

* * * * *